(12) United States Patent
Lu

(10) Patent No.: US 6,581,863 B1
(45) Date of Patent: Jun. 24, 2003

(54) TRANSMISSION STRUCTURE OF FISHING REEL

(76) Inventor: Han-Chi Lu, No. 22, Jien Ren Street, Taichung City (TW)

(*) Notice: Subject to any disclaimer, the term of this patent is extended or adjusted under 35 U.S.C. 154(b) by 0 days.

(21) Appl. No.: 10/036,249

(22) Filed: Jan. 3, 2002

(51) Int. Cl.[7] ............................................. A01K 89/017
(52) U.S. Cl. ....................................... 242/242; 242/249
(58) Field of Search ................................. 242/242, 249, 242/263, 277, 278

(56) References Cited

U.S. PATENT DOCUMENTS

| | | | | |
|---|---|---|---|---|
| 4,026,493 A | * | 5/1977 | Anderson | 242/264 |
| 4,114,825 A | * | 9/1978 | Murvall | 242/242 |
| 4,191,343 A | * | 3/1980 | Morishita | 242/242 |
| 5,934,586 A | * | 8/1999 | Kang et al. | 242/241 |
| 6,264,125 B1 | * | 7/2001 | Cockerham et al. | 242/242 |
| 6,290,157 B1 | * | 9/2001 | Shibata | 242/241 |
| 6,457,661 B1 | * | 10/2002 | Young | 242/241 |

* cited by examiner

Primary Examiner—Emmanuel Marcelo
(74) Attorney, Agent, or Firm—Charles E. Baxley

(57) ABSTRACT

A transmission structure of a fishing reel includes a housing, a gear transmission set, and a slide block. The gear transmission set includes a handle for rotating an actuating gear which rotates an idler which rotates a drive gear. A locking column is secured in the housing to function as a guide member for guiding movement of the slide block. The slide block is juxtaposed to the actuating gear and the drive gear, thereby reducing the volume. The slide block is secured on the distal end of the spindle of the fishing reel, thereby reducing the volume.

5 Claims, 5 Drawing Sheets

TRANSMISSION STRUCTURE OF FISHING REEL

BACKGROUND OF THE INVENTION

1. Field of the Invention

The present invention relates to a transmission structure of a fishing reel, and more particularly to a transmission structure of a fishing reel, wherein the slide block is juxtaposed to the actuating gear and the drive gear, thereby reducing the volume.

2. Description of the Related Art

A conventional transmission structure of a fishing reel of the prior art shown in FIG. 1 comprises a housing 10, a gear transmission set 11 mounted in the housing 10 and having a gear 12, and a drive rod 13 mounted on a periphery of the gear 12. The drive rod 13 of the gear 12 may slide in a guide groove 15 in a slide 14, so that the slide 14 may move reciprocally to drive a spindle 16 of the fishing reel to move reciprocally. The slide 14 is provided with a guide rod 17, and the inner wall of the housing 10 is provided with a guide slot 18 to mate with the guide rod 17.

However, the conventional transmission structure of a fishing reel of the prior art has the following disadvantages.

1. The slide 14 needs to be provided with a guide rod 17, and the inner wall of the housing 10 needs to be provided with a guide slot 18 to mate with the guide rod 17, thereby increasing cost of fabrication and material.
2. The guide rod 17 and the guide 18 occupy large space, so that the fishing reel has a larger volume.

SUMMARY OF THE INVENTION

The present invention has arisen to mitigate and/or obviate the disadvantage of the conventional transmission structure of a fishing reel.

The primary objective of the present invention is to provide a transmission structure of a fishing reel, wherein the slide block is juxtaposed to the actuating gear and the drive gear, thereby reducing the volume of the transmission structure of the fishing reel.

Another objective of the present invention is to provide a transmission structure of a fishing reel, wherein the slide block is secured on the distal end of the spindle of the fishing reel, thereby reducing the volume of the transmission structure of the fishing reel.

A further objective of the present invention is to provide a transmission structure of a fishing reel, wherein the locking column secured in the housing may function as a guide structure for guiding movement of the slide block, thereby reducing the volume of the transmission structure of the fishing reel.

In accordance with the present invention, there is provided a transmission structure of a fishing reel, comprising:

a housing, a gear transmission set mounted in the housing, a guide member mounted in the housing, and a slide block mounted in the housing, the gear transmission set including a handle secured with an actuating gear for rotating the actuating gear which drives and rotates an idler which meshes with a drive gear to rotate the drive gear, a drive rod eccentrically secured on a periphery of the drive gear to rotate therewith, the drive rod slidably mounted in a guide track formed in the slide block, so that the slide block may be moved reciprocally by actuating of the drive rod, so as to drive a spindle to move reciprocally, wherein:

the guide member is an elongated locking column that may mate with a screw to lock and secure the housing;

the slide block is juxtaposed to the actuating gear and the drive gear, the slide block is slidably mounted on the locking column in the housing, the slide block is secured on a distal end of the spindle, and the slide block is formed with a slide track for receiving the locking column in the housing, so that the slide block may slide on the locking column.

Further benefits and advantages of the present invention will become apparent after a careful reading of the detailed description with appropriate reference to the accompanying drawings.

DETAILED DESCRIPTION OF THE INVENTION

Figure 1:
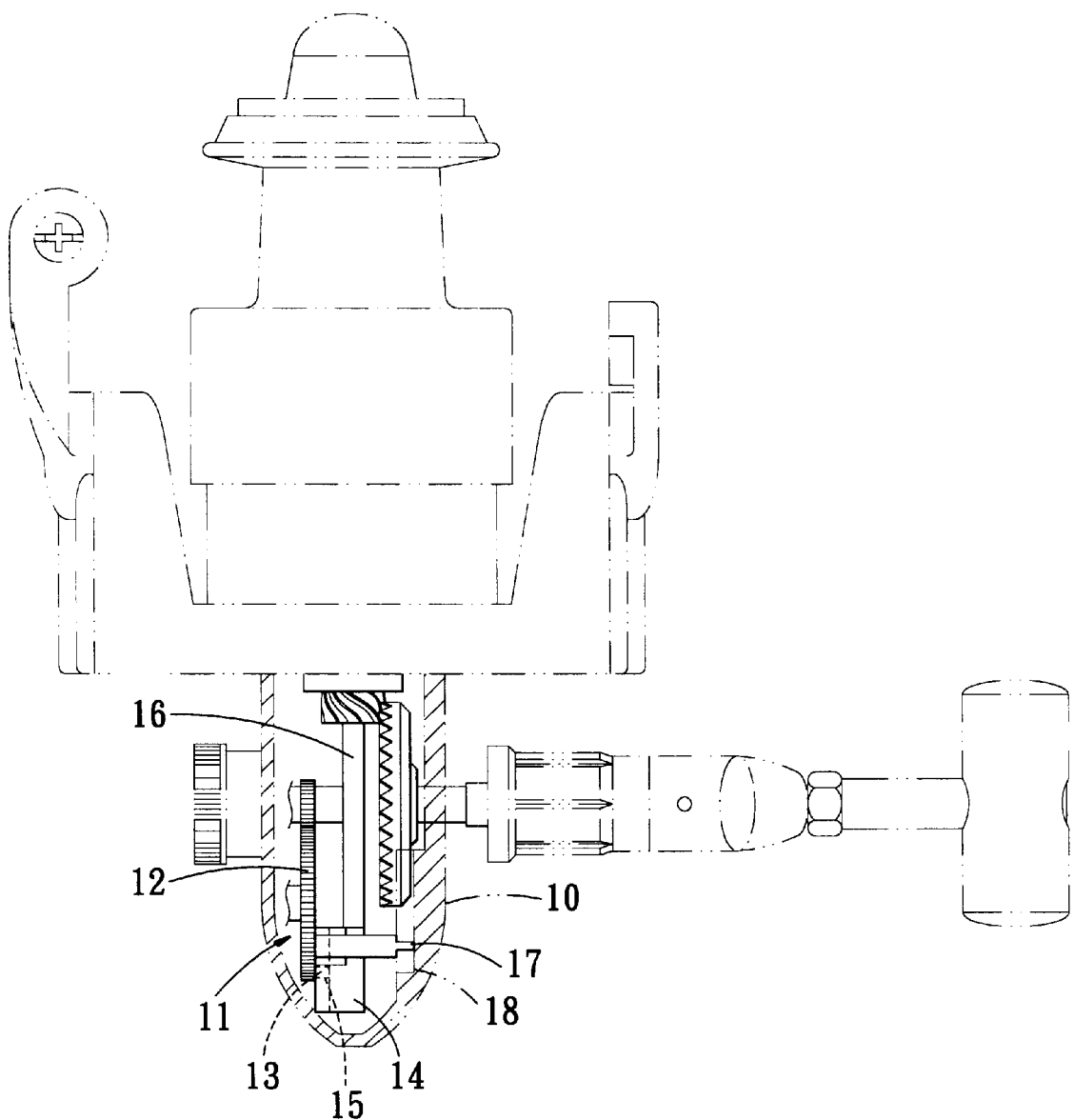
FIG. 1 is a plan cross-sectional view of a conventional transmission structure of a fishing reel in accordance with the prior art.
Figure 2:
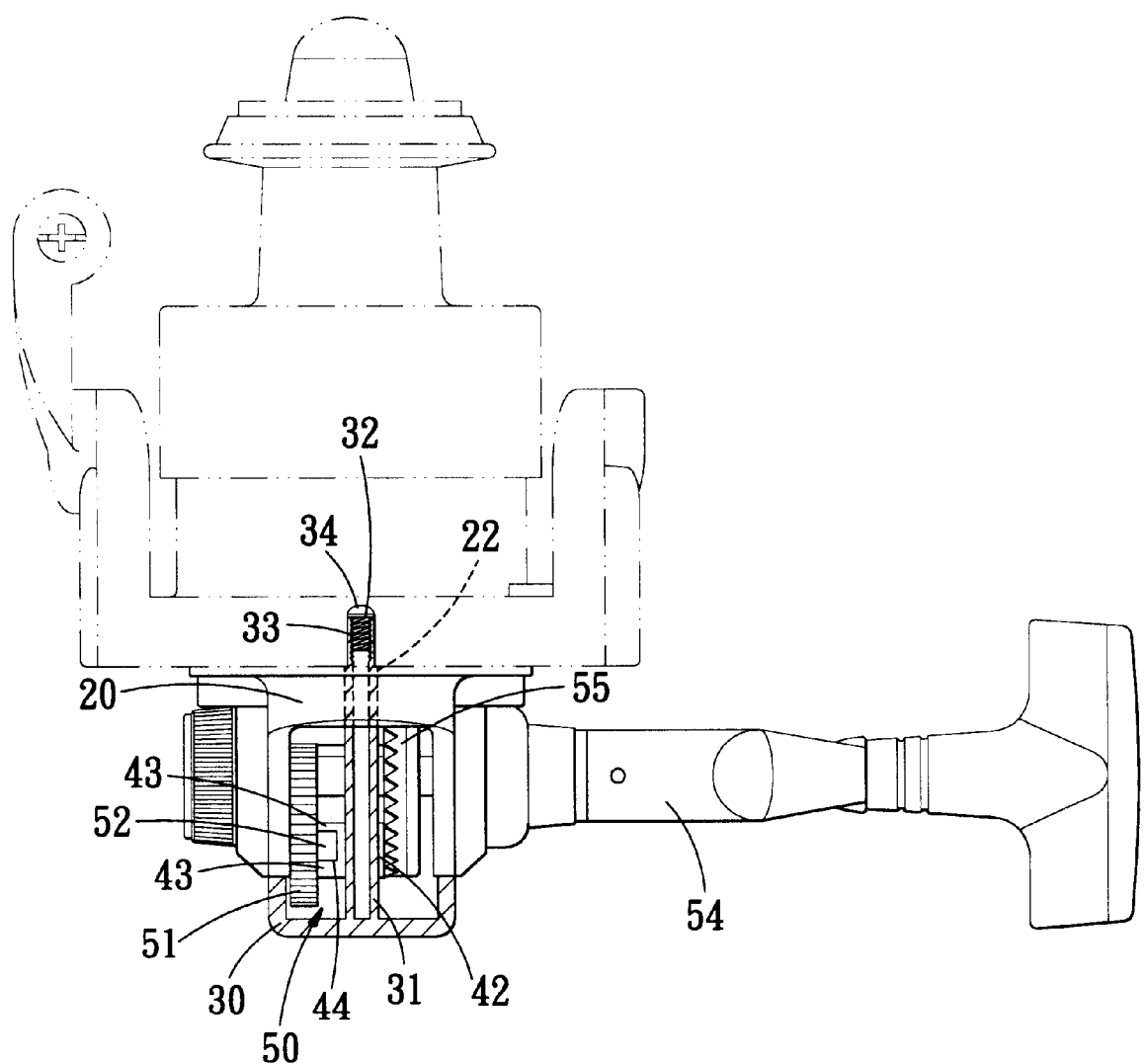
FIG. 2 is a plan cross-sectional view of a transmission structure of a fishing reel in accordance with the present invention.
Figure 3:
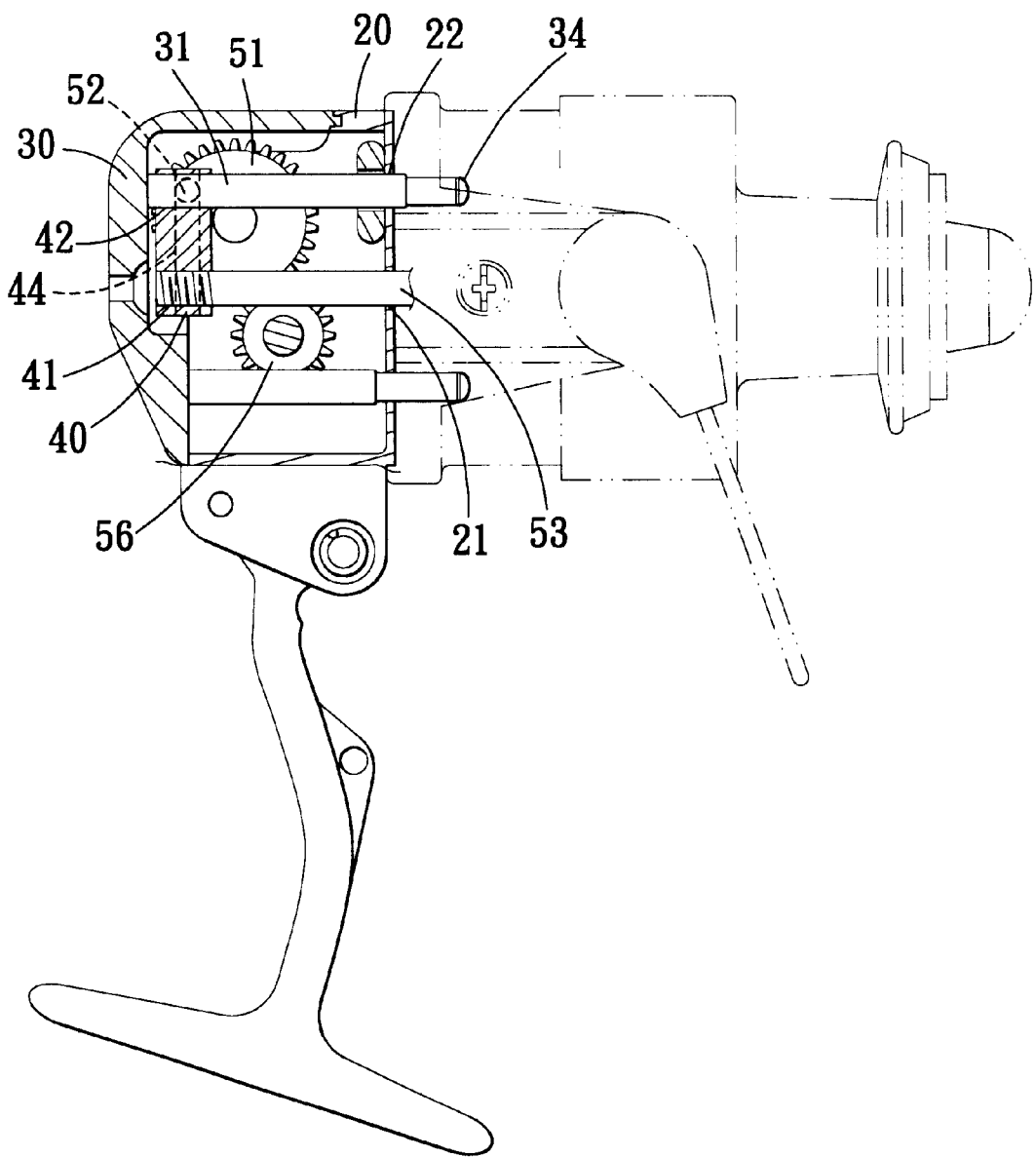
FIG. 3 is a plan cross-sectional view of a transmission structure of a fishing reel in accordance with the present invention.

Referring to the drawings and initially to FIGS. 1–3, a transmission structure of a fishing reel in accordance with a preferred embodiment of the present invention comprises a housing, a gear transmission set 50, and a slide block 40.

The housing includes a front casing 20, and a rear casing 30 secured with the front casing 20.

The gear transmission set 50 is mounted in the housing between the front casing 20 and the rear casing 30, and includes a drive gear 51, a drive rod 52, a spindle 53, a handle 54, an actuating gear 55, and an idler 56. The handle 54 is secured with the actuating gear 55 for rotating the actuating gear 55 which drives and rotates the idler 56 which meshes with the drive gear 51 to rotate the drive gear 51. The drive rod 52 is eccentrically secured on a periphery of the drive gear 51 to rotate therewith. The spindle 53 is movably mounted in the housing and has a first end extended through a pivot hole 21 formed in the front casing 20.

An elongated locking column 31 is mounted in the housing so as to function as a guide member, and has a first end extended through a through hole 22 formed in the front casing 20, and a second end secured on an inner wall of the rear casing 30. The second end of the locking column 31 has an end face 32 formed with a locking hole 33, and a screw 34 is screwed into the locking hole 33 for securing the locking column 31.

The slide block 40 is mounted in the housing to co-operate with the gear transmission set 50. The slide block 40 has a first side formed with a mounting hole 41 for securing a second end of the spindle 53, so that the spindle 53 may be moved by the slide block 40. The slide block 40 has a second side formed with a slide track 42 slidably mounted on the second end of the locking column 3, so that the slide block 40 may slide on the locking column 3. The slide block 40 is formed with two opposite side walls 43 which define a substantially U-shaped guide track 44 therebetween. The drive rod 52 secured on the drive gear 51 is slidably mounted in the guide track 44 between the two side walls 43 of the slide block 40.

Figure 4:
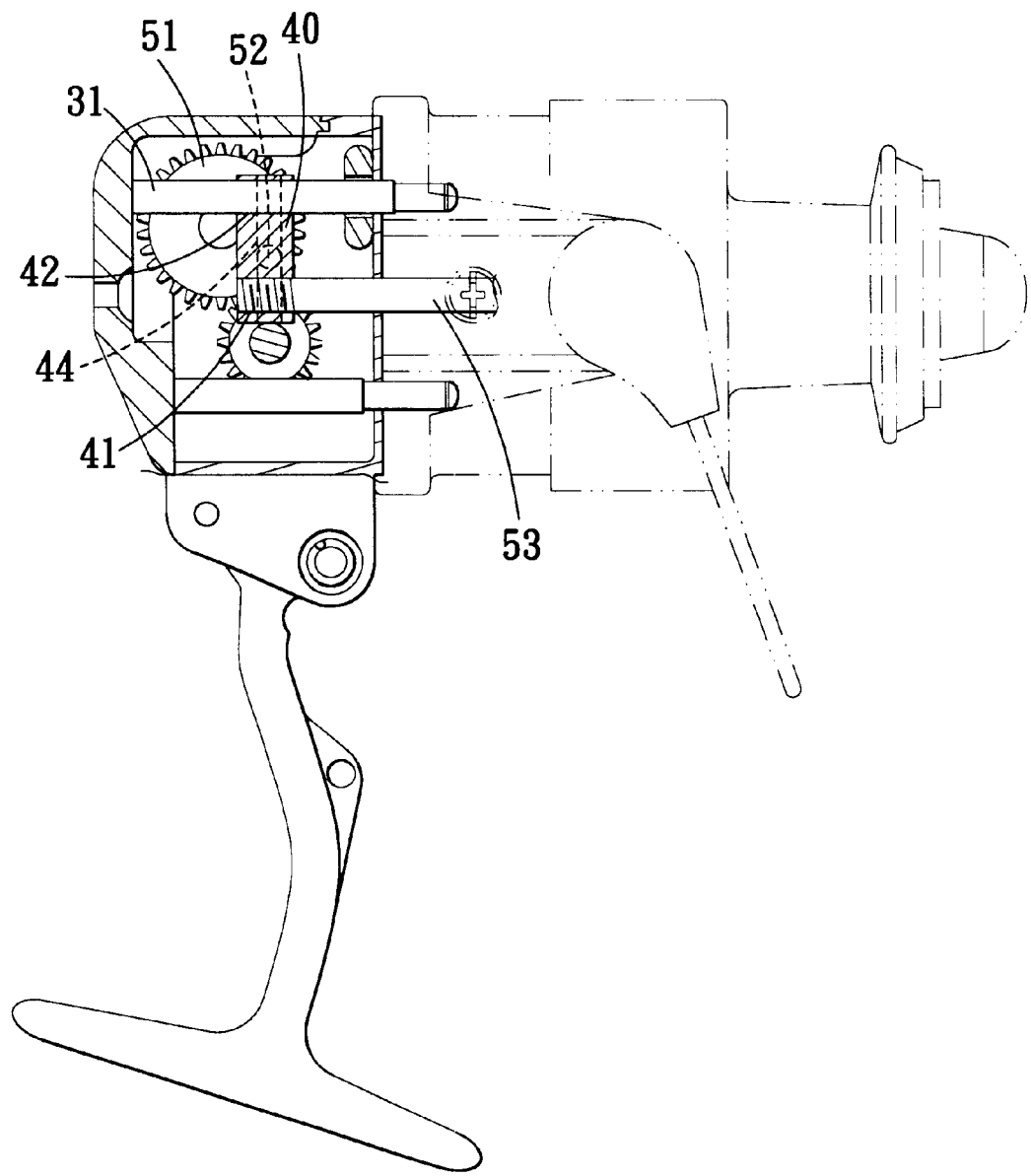
FIG. 4 is a schematic operational view of the transmission structure of a fishing reel as shown in FIG. 3 in use.
Figure 5:
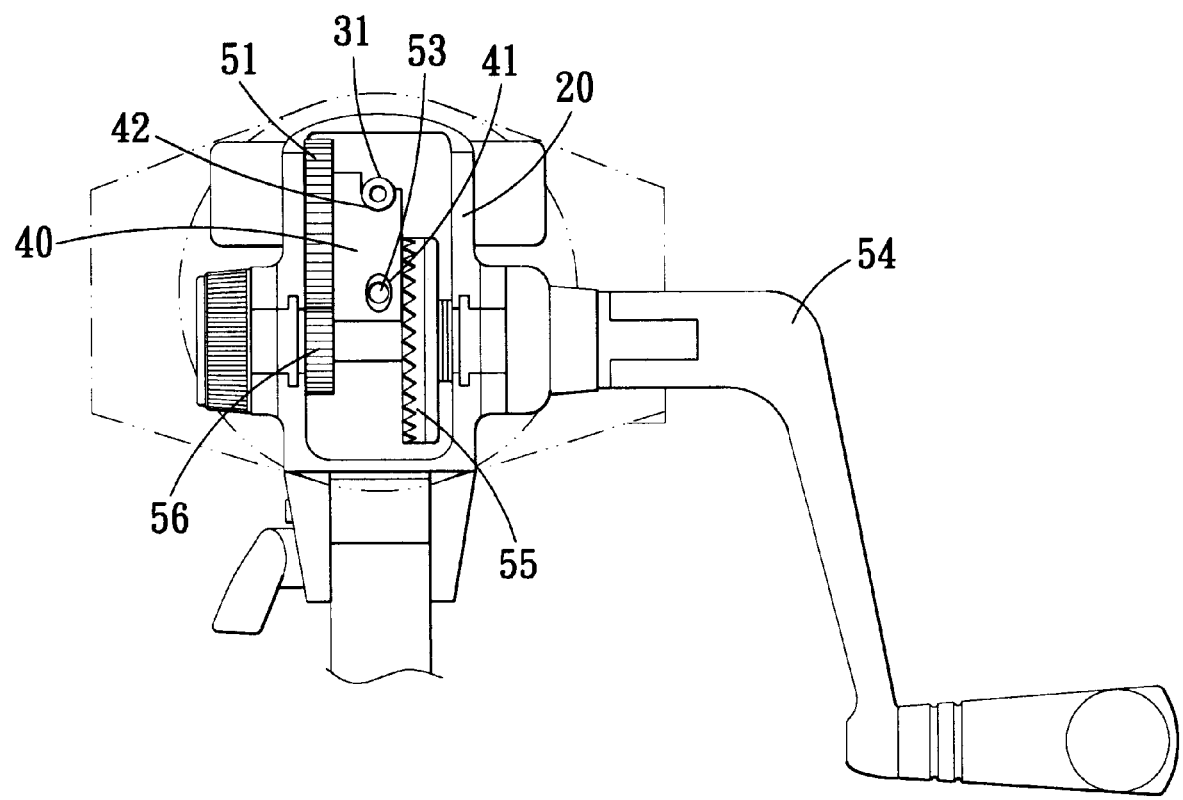
FIG. 5 is a schematic plan view of the transmission structure of a fishing reel in accordance with the present invention.

In operation, referring to FIGS. 1–5, the handle 54 may be rotated to rotate the actuating gear 55 which drives and rotates the idler 56 which rotates the drive gear 51. When the drive gear 51 is rotated, the drive rod 52 is rotated with the drive gear 51. At the same time, the drive rod 52 may slide in the guide track 44 of the slide block 40. Thus, the drive rod 52 is rotated with the drive gear 51 to slide in the guide track 44 of the slide block 40, thereby forcing the slide block 40 to reciprocally move and slide on the locking column 31 from the position as shown in FIG. 3 to the position as shown in FIG. 4, so that the spindle 53 may be moved by the slide block 40 from the position as shown in FIG. 3 to the position as shown in FIG. 4. Thus, the spindle 53 of the fishing reel may be driven by the slide block 40 to move reciprocally.

Accordingly, the slide block 40 is juxtaposed to the drive gear 51 and the actuating gear 55, thereby greatly reducing the space occupied by the transmission structure of the fishing reel of the present invention during operation. In addition, the mounting hole 41 of the slide block 40 is mounted on the distal end of the spindle 53, thereby preventing consumption of space. Further, the front casing 20 may be combined with the rear casing 30 easily by guidance of the locking column 31. Further, the slide block 40 may be moved reciprocally by guidance of the locking column 31, so that the slide block 40 may be moved stably and rigidly.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A transmission structure of a fishing reel, comprising: a housing, a gear transmission set mounted in the housing, a guide member mounted in the housing, and a slide block mounted in the housing, the gear transmission set including a handle secured with an actuating gear for rotating the actuating gear which drives and rotates an idler which meshes with a drive gear to rotate the drive gear, a drive rod eccentrically secured on a periphery of the drive gear to rotate therewith, the drive rod slidably mounted in a guide track formed in the slide block, so that the slide block may be moved reciprocally by actuating of the drive rod, so as to drive a spindle to move reciprocally, wherein:

the guide member is an elongated locking column that may mate with a screw to lock and secure the housing;

the slide block is juxtaposed to the actuating gear and the drive gear, the slide block is slidably mounted on the locking column in the housing, the slide block is secured on a distal end of the spindle, and the slide block is formed with a slide track for receiving the locking column in the housing, so that the slide block may slide on the locking column.

2. The transmission structure of a fishing reel in accordance with claim 1, wherein the locking column has an end face formed with a locking hole for receiving the screw.

3. The transmission structure of a fishing reel in accordance with claim 1, wherein the slide block is formed with a mounting hole for securing the distal end of the spindle, so that the spindle may be moved by the slide block.

4. The transmission structure of a fishing reel in accordance with claim 1, wherein the slide block is formed with two opposite side walls which define the guide track therebetween, and the drive rod is slidably mounted in the guide track between the two side walls of the slide block.

5. The transmission structure of a fishing reel in accordance with claim 1, wherein the slide track of the slide block is substantially U-shaped.

* * * * *